United States Patent
Hilliard et al.

(10) Patent No.: US 6,639,521 B2
(45) Date of Patent: Oct. 28, 2003

(54) INDUCTIVE SENSOR AND METHOD OF USE

(75) Inventors: Steven R. Hilliard, Burlington, NC (US); Geoffrey W. Hilliard, Signal Mountain, TN (US)

(73) Assignee: Inductive Signature Technologies, Knoxville, TN (US)

(*) Notice: Subject to any disclaimer, the term of this patent is extended or adjusted under 35 U.S.C. 154(b) by 197 days.

(21) Appl. No.: 09/945,935

(22) Filed: Sep. 4, 2001

(65) Prior Publication Data

US 2002/0018007 A1 Feb. 14, 2002

Related U.S. Application Data

(62) Division of application No. 09/532,590, filed on Mar. 22, 2000, now Pat. No. 6,380,868.
(60) Provisional application No. 60/125,660, filed on Mar. 22, 1999.

(51) Int. Cl.[7] .................................................. G08G 1/01
(52) U.S. Cl. ........................ 340/941; 340/933; 340/934; 340/935; 377/9
(58) Field of Search ................................. 340/941, 933, 340/935, 934, 988; 377/9

(56) References Cited

U.S. PATENT DOCUMENTS

| | | | |
|---|---|---|---|
| 1,992,214 A | 2/1935 | Katz ........................... 340/941 |
| 3,641,569 A | 2/1972 | Bushnell et al. ............. 340/941 |
| 3,873,964 A | 3/1975 | Potter .......................... 340/939 |
| 3,927,389 A | 12/1975 | Neeloff ........................ 340/940 |
| 3,943,339 A | 3/1976 | Koerner et al. ................. 377/9 |
| 3,984,764 A | 10/1976 | Koerner ....................... 340/941 |
| 3,991,485 A | 11/1976 | Golenski ...................... 434/66 |
| 4,239,415 A | 12/1980 | Blikken ....................... 404/75 |
| 4,276,539 A | 6/1981 | Eshraghian et al. ......... 340/939 |
| 4,302,746 A * | 11/1981 | Scarzello et al. ........... 340/938 |
| 4,449,115 A * | 5/1984 | Koerner ....................... 340/941 |
| 5,245,334 A | 9/1993 | Gebert et al. ................ 340/933 |
| 5,361,064 A * | 11/1994 | Hamer et al. ................ 340/939 |
| 5,491,475 A | 2/1996 | Rouse et al. ................. 340/933 |
| 5,508,698 A * | 4/1996 | Hoekman ..................... 340/936 |
| 5,523,753 A | 6/1996 | Fedde et al. ................. 336/208 |
| 5,614,894 A | 3/1997 | Stanczyk ..................... 340/933 |
| 5,734,338 A * | 3/1998 | Hoekman et al. ............ 340/941 |
| 5,861,820 A | 1/1999 | Kerner et al. ................ 340/934 |
| 6,337,602 B2 * | 1/2002 | Hilliard et al. ................ 331/65 |
| 6,342,845 B1 * | 1/2002 | Hilliard et al. .............. 340/941 |
| 6,380,868 B1 * | 4/2002 | Hilliard et al. .............. 340/941 |
| 6,417,784 B1 * | 7/2002 | Hilliard et al. .............. 340/941 |

* cited by examiner

Primary Examiner—Daryl Pope
(74) Attorney, Agent, or Firm—Pitts & Brittian, P.C.

(57) ABSTRACT

An apparatus for detecting inductance, which is generally disposed outside of the roadway surface. The apparatus includes at least one large aperture wire-loop deployed beside the roadway, on either or both sides, to detect vehicular traffic passing nearby. Alternatively, the apparatus includes at least one large aperture wire-loop deployed such that vehicular traffic passes through the opening defined by the wire-loop(s).

21 Claims, 11 Drawing Sheets

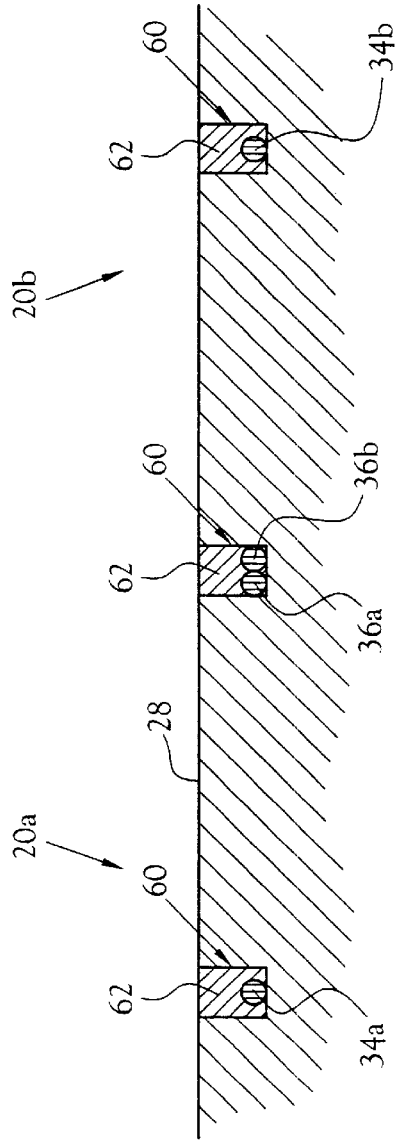
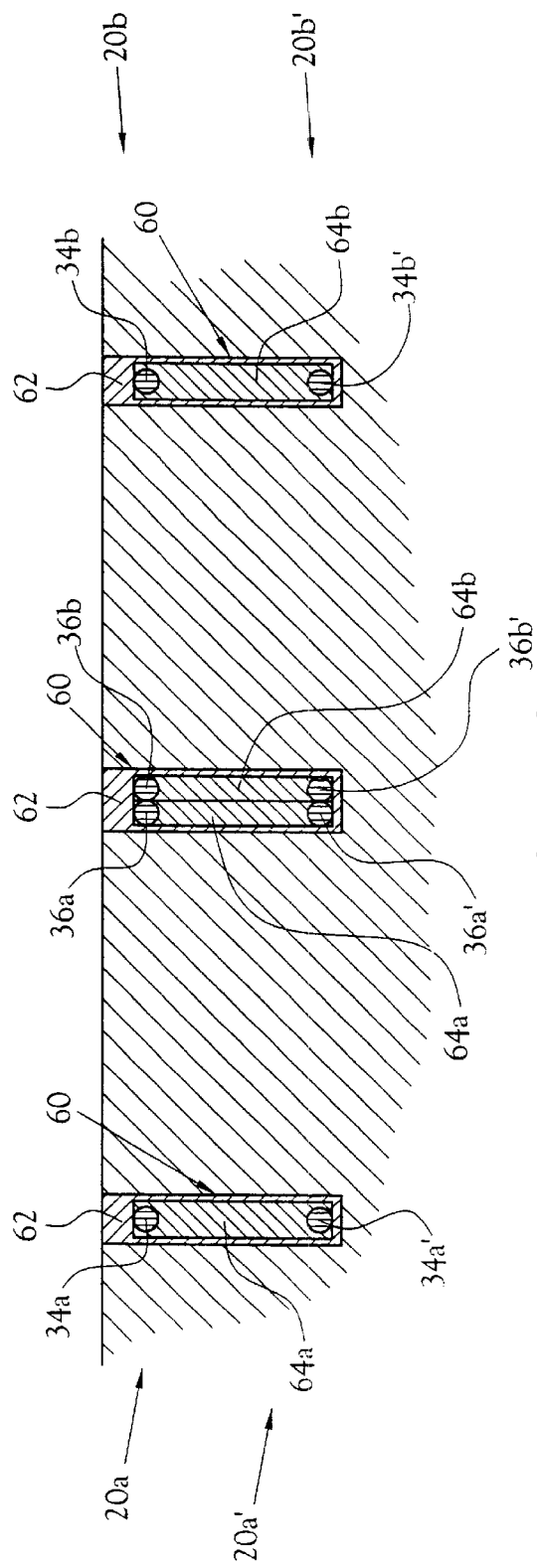

INDUCTIVE SENSOR AND METHOD OF USE

CROSS-REFERENCE TO RELATED APPLICATIONS

This is a division of application Ser. No. 09/532,590, filed Mar. 22, 2000, now U.S. Pat. No. 6,380,868 which claims the benefit of U.S. Provisional Application No. 60/125,660, filed Mar. 22, 1999.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus and method for the measurement of inductance. More precisely the present invention relates to an apparatus and method for the measurement of inductance of vehicles moving in a traffic lane using permeability-modulated carrier referencing.

It is well known in the prior art to measure the inductance of a wire-loop, which is part of the frequency determining circuit of an inductance-capacitance-resistance ("LCR") oscillator, using frequency-counting techniques. Typically, the number of zero-crossings per time increment of the voltage across the terminals of the LCR capacitor is counted. Because the frequency of the LCR oscillator is inversely proportional to the square root of the inductance of the LCR circuit, changes in the inductance of the wire-loop are reflected in changes of the number of zero-crossings counted per time increment.

2. Description of the Related Art

It is well-known in the prior art to measure the inductance of a wire-loop, which is part of the frequency determining circuit of an LCR oscillator, using frequency counting techniques. Typically, the number of zero-crossings per time increment of the voltage across the terminals of the LCR capacitor, C, are counted. Because the frequency of the LCR oscillator is inversely proportional to the square-root of the inductance, L, of the LCR circuit, changes in the inductance of the wire-loop are reflected in changes of the number of zero-crossings counted per time increment.

The Class-C wire-loop oscillator described in U.S. Pat. No. 3,873,964 issued to Thomas R. Potter on Mar. 25, 1975 is typical of LCR oscillators used in the prior-art. When a vehicle passes over a wire-loop connected to a running LCR oscillator, the metal of the vehicle changes the permeability of some of the space surrounding the wire-loop causing modulation of the carrier wave generated by the LCR oscillator. Changes in the inductance of the wire-loop caused by the vehicle are thus superimposed onto the LCR oscillator's carrier wave, yielding a permeability-modulated carrier. Next, the inductive signature is retrieved from the permeability-modulated carrier. One method of demodulating the carrier is the use of frequency counting techniques, such as with "signature cards" which are commercially available from 3M Corporation and Peek Traffic. The signature cards offer approximately a 100 Hz-sample rate, which is not fully adequate for demodulating the inductive signatures of vehicles moving at highway speeds.

Another problem associated with the measurement of inductance in a wire-loop is crosstalk. Crosstalk between two or more wire-loops is a result of inductive coupling between the wire-loops, which results in energy transfer between the wire-loops when a changing current is flowing through them. If two wire-loops are operating at nearly the same frequency, then the energy transfer can result in an exaggerated buildup, or stagnation, of transferred energy in one LCR circuit, and a corresponding exaggerated energy depression in the other. This can cause the carrier waves of the two circuits to become entrained with each other in a more-or-less fixed phase differential and effectively eliminates the ability of the wire-loops to detect vehicles independently of each other. Typically, an inductive coupling coefficient of only a few percent is sufficient to cause complete entrainment. In prior-art vehicle detectors, carrier wave entrainment due to crosstalk is partially avoided by operating the oscillator circuits associated with the wire-loops at different frequencies, typically by varying the value of the capacitance, C, of the LCR circuit. This can prevent stagnation and entrainment, but does not address the underlying errors induced into each detector by the energy transfer due to mutual inductive coupling.

Accordingly, there is a need for an apparatus and method for measuring the changes in the inductance of a wire-loop caused by a vehicle traveling along a monitored roadway. The apparatus and method need be capable of measuring changes in the inductance of a wire-loop caused by a vehicle traveling at highway speeds. Further, the apparatus and method should be capable of measuring inductance without attempting to identify frequency changes. Finally, there is a need for an apparatus and method capable of measuring inductance using multiple inductive sensors without significant errors resulting from crosstalk.

Therefore, it is an object of the present invention to provide an apparatus and method for measuring changes in the inductance of a wire-loop caused by a vehicle traveling along a monitored roadway.

It is another object of the present invention to provide an apparatus and method for measuring changes in the inductance of a wire-loop caused by a vehicle traveling at highway speeds.

It is a further object of the present invention to provide an apparatus and method for measuring changes in the inductance of a wire-loop caused by a vehicle and producing an inductive signature for that vehicle.

It is yet another object of the present invention to provide an apparatus and method for measuring changes in the inductance of a wire-loop caused by a vehicle and producing an inductive signature of that vehicle by referencing a measured voltage to a permeability-modulated current carrier wave.

A still further object of the present invention is to provide an apparatus and method for measuring changes in the inductance of a wire-loop caused by a vehicle using multiple inductive sensors without significant errors resulting from crosstalk.

Another object is to provide an apparatus and method for measuring changes in the inductance of a wire-loop caused by a vehicle which does not need to be installed in the driving surface of a roadway.

BRIEF SUMMARY OF THE INVENTION

In a typical LCR circuit, a number of factors are related to the value of the inductance. For example, the frequency is inversely proportional to the square root of the inductance, L. This relationship is a consequence of the direct dependence of the instantaneous rate of change in current flow, $\delta I$, upon the value of the inductance. Accordingly, frequency is only an indirect indication of this more general relationship because the circuit voltage, V, is in turn a function of current, I, and capacitance, C. A more direct indication of inductance in an LCR oscillator is the amplitude of the current function, I(t), which is inversely proportional to the inductance of the LCR circuit. The changing current function, I(t), in the LCR circuit of an inductive vehicle detector is a permeability-modulated carrier. This carrier is modulated in both frequency and amplitude by the changing apparent permeability of the space surrounding a wire-loop caused by the motion of a nearby metallic object, typically an automotive vehicle. It should be noted that induced electromagnetic noise, such as from high voltage power lines, also effectively modulates the current function carrier wave. However, the induced noise modulates the voltage function, V(t), in an asymmetric manner by shifting the voltage function on the magnitude axis. Because the modulation resulting from the induced noise affects the current flow and the voltage function differently, the permeability-modulated current carrier function, I(t), can be cross-referenced with the voltage function, V(t), to isolate the desired inductance from the induced noise. This method of isolating the inductance is known as permeability-modulated carrier referencing (PMCR). PMCR is particularly effective at removing low-frequency induced noise from an inductance measuring circuit. Those skilled in the art will recognize that although PMCR is described herein with reference to an LCR oscillator, the principles are equally applicable to other forms of carrier functions including, but not limited to, pulsed-type discrete cycle inductance measurement techniques.

Another factor affecting the performance of the present invention is crosstalk wherein the direction of current flow in an inductor determines the direction of the induced differential current flow in inductors that are inductively coupled to it. One method of reducing crosstalk is to nullify the underlying mutual inductive coupling of a plurality of wire-loops using passive transformers. The passive transformer inductively couples the inductors in precisely the opposite polarity and magnitude in which they were originally coupled nullifying the original coupling and eliminating the potential for crosstalk at the source. In addition to removing the gross errors introduced by crosstalk, nullification of the inductive coupling also removes the more subtle transient errors in the detectors, which appear as non-repeatable errors in recorded inductive signatures.

A single-turn wire-loop spanning the width of one or more traffic lanes is sufficient to detect the speed, the direction, the lane position, and the wheelbase dimensions for any vehicle passing over the wire-loop. The speed and the lateral lane position of a vehicle are unambiguously determined if the two active legs of the wire-loop span the traffic lanes at different skew angles. Symmetric skew angles also produce useful data, but are ambiguous in resolving the vehicle direction. Similar skew angles are unable to resolve the lane position; however, this is not as important for single traffic lanes as it is for multiple traffic lanes. Finally, zero skew angles can produce speed and axle-count data, but are ambiguous in resolving vehicle direction, can not resolve the lane position or the width of the wheelbase, and are ambiguous with respect to vehicle continuity when multiple traffic lanes are involved.

For multi-lane traffic, a pair of single-turn wire-loops in a complimentary wedge-shaped configuration is ideal for collecting the maximum unambiguous traffic-flow data. This configuration is a hybrid of rectangular wire-loops and blades which gives repeatability of signatures that is characteristic of the blades along with the less-intrusive installation that is characteristic of simple wire-loops. Shallow saw-cuts are desirable for a traffic sensor spanning long distances in a pavement surface to prevent the formation of a shear-plane and slot faulting.

A large-aperture wire-loop can detect metallic objects at great distances. The magnetic field generated by a wire-loop is highly directional at a significant distance from the wire-loop. More precisely, a wire-loop is most sensitive to distant objects in the same plane as the wire-loop and sensitivity decreases as the object moves away from the plane of the wire-loop. At a significant distance, objects approaching the plane perpendicular to that of the wire-loop are virtually invisible to the wire-loop. This directional sensitivity of the wire-loop is useful in determining the relative direction to detected objects in a similar way as a radar antenna is directional. Large-aperture wire-loops are used in non-intrusive vehicle-detecting applications because they do not need to be embedded in or laid on the pavement to detect passing vehicles.

BRIEF DESCRIPTION OF THE SEVERAL VIEWS OF THE DRAWINGS

The above-mentioned features of the invention will become more clearly understood from the following detailed description of the invention read together with the drawings in which:

FIG. 9 illustrates a cross-section of the wire-loop pair illustrated in FIGS. 7 and 8;

FIG. 10 illustrates a cross-section of an alternate embodiment of the wire-loop vehicle detector having two pair of substantially parallel and concentric wire-loops which are vertically separated from one another configured as illustrated in FIGS. 7 and 8;

DETAILED DESCRIPTION OF THE INVENTION

An apparatus and method for measuring the inductance of a wire-loop without direct reference to any particular time-constant or frequency is illustrated generally at 10 in the figures. The apparatus 10 utilizes permeability-modulated carrier referencing to identify the inductive signature of a vehicle passing over a wire-loop.

In a typical LCR circuit, a number of factors are related to the value of the inductance. For example, the frequency is inversely proportional to the square root of the inductance, L. This relationship is a consequence of the direct dependence of the instantaneous rate of change in current flow, δI, upon the value of the inductance as defined in the following equation:

$$\delta I = \frac{V}{L} \qquad (1)$$

Accordingly, frequency is only an indirect indication of this more general relationship because the circuit voltage, V, is in turn a function of current, I, and capacitance, C, as defined in the following equation:

$$\delta V = \frac{I}{C} \qquad (1)$$

A more direct indication of inductance in an LCR oscillator is the amplitude of the current function, I(t), which is inversely proportional to the inductance of the LCR circuit. The changing current function, I(t), in the LCR circuit of an inductive vehicle detector is a permeability-modulated carrier. This carrier is modulated in both frequency and amplitude by the changing apparent permeability of the space surrounding a wire-loop caused by the motion of a nearby metallic object, typically an automotive vehicle. It should be noted that induced electromagnetic noise, such as from high voltage power lines, also effectively modulates the current function carrier wave. However, the induced noise modulates the voltage function, V(t), in an asymmetric manner by shifting the voltage function on the magnitude axis. Because the modulation resulting from the induced noise affects the current flow and the voltage function differently, the permeability-modulated current carrier function, I(t), can be cross-referenced with the voltage function, V(t), to isolate the desired inductance signature from the induced noise. This method of isolating the inductance signature is known as permeability-modulated carrier referencing (PMCR). PMCR is particularly effective at removing low-frequency induced noise from an inductance measuring circuit. Those skilled in the art will recognize that although PMCR is described herein with reference to an LCR oscillator, the principles are equally applicable to other forms of carrier functions including, but not limited to, pulsed-type discrete cycle inductance measurement techniques.

Figure 1:
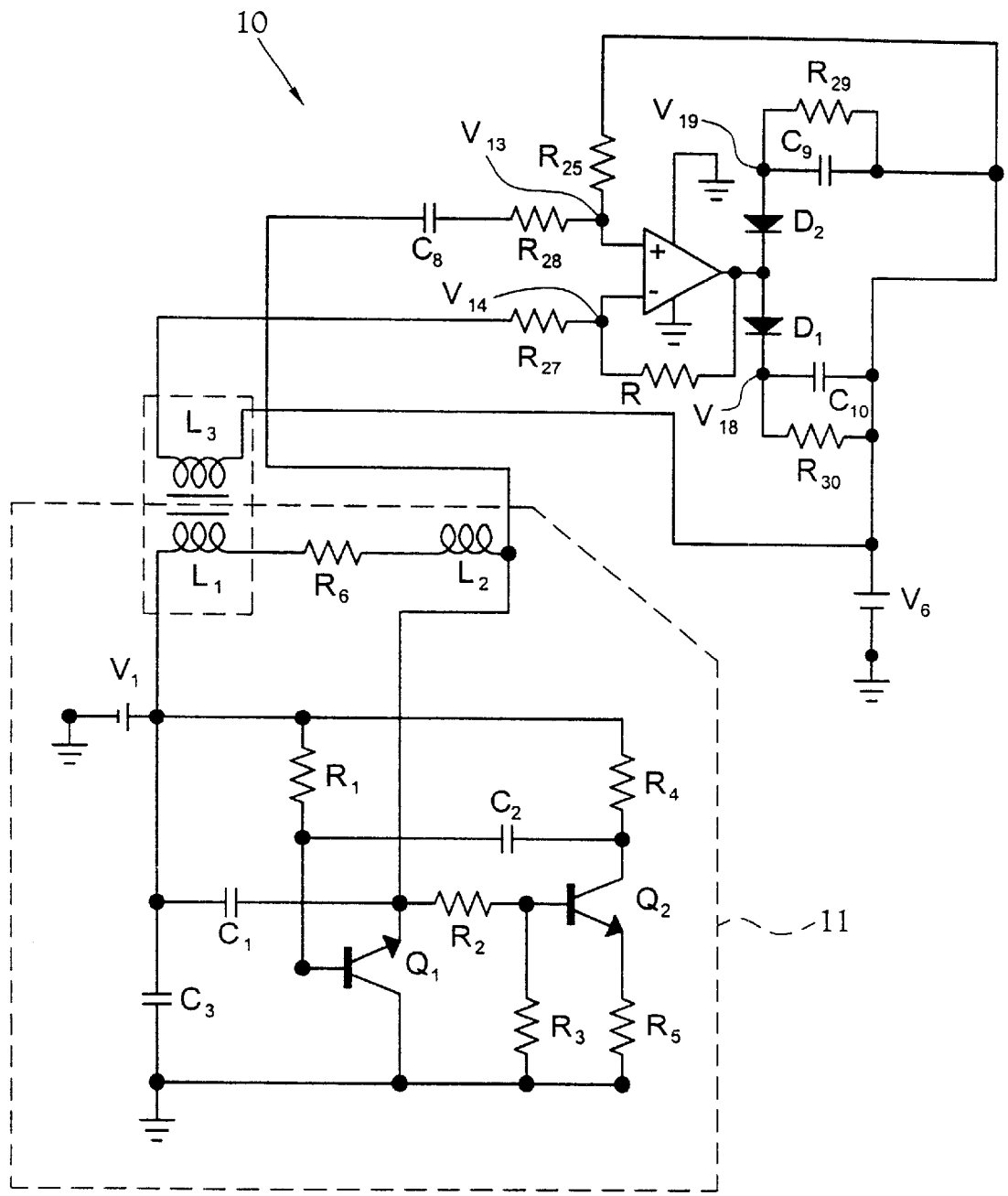
FIG. 1 is a schematic diagram of an inductance measuring circuit of the preferred embodiment of the present invention.

FIG. 1 illustrates a circuit diagram of one embodiment of the present invention for PMCR. The illustrated embodiment includes a class-C oscillator 11 connected to signal conditioning electronics. Using the signal conditioning electronics, a high sample rate relative to prior-art vehicle detectors is achieved by measuring the amplitude modulation of the voltage, V(t), and changing current, I(t), rather than measuring frequency changes. Those skilled in the art will recognize that other oscillators could be substituted for the class-C oscillator 11 shown without interfering with the objects and advantages of the present invention.

Figure 2:
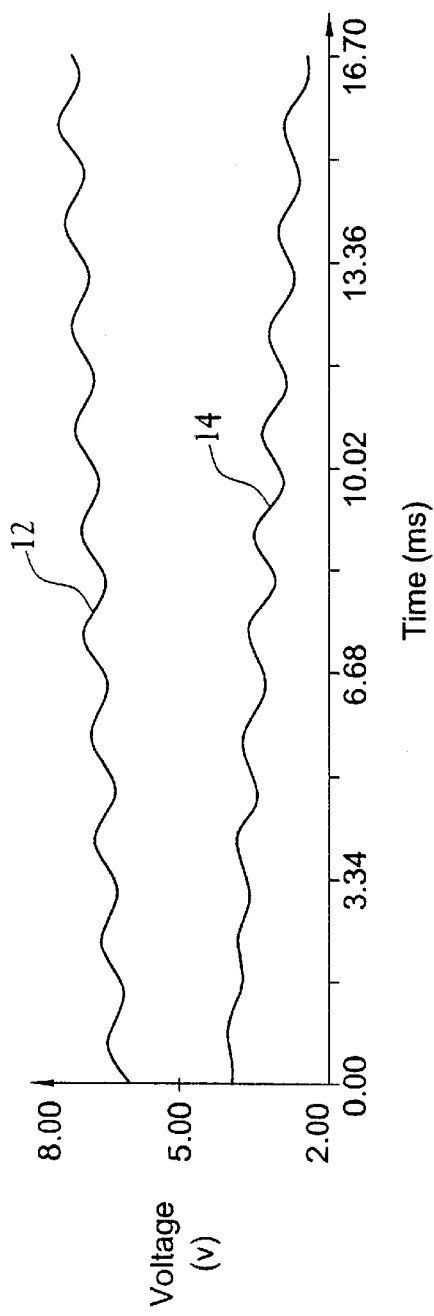
FIG. 2 is a plot of the raw waveform data produced by a circuit simulation of the inductance measuring circuit of FIG. 1.
Figure 3:
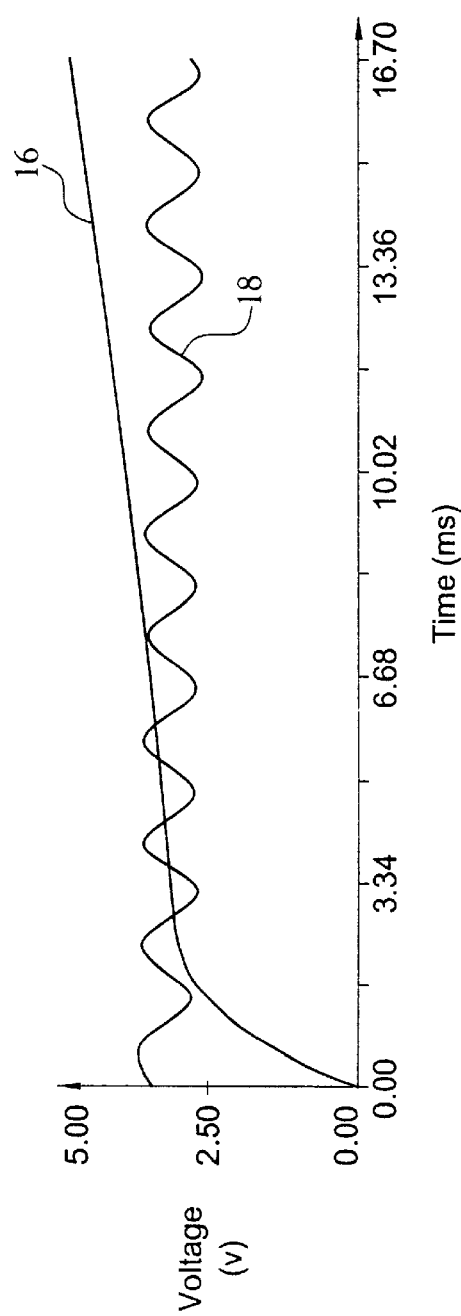
FIG. 3 is a plot of the mixed waveform data produced by a circuit simulation of the inductance measuring circuit of FIG. 1.
Figure 4:
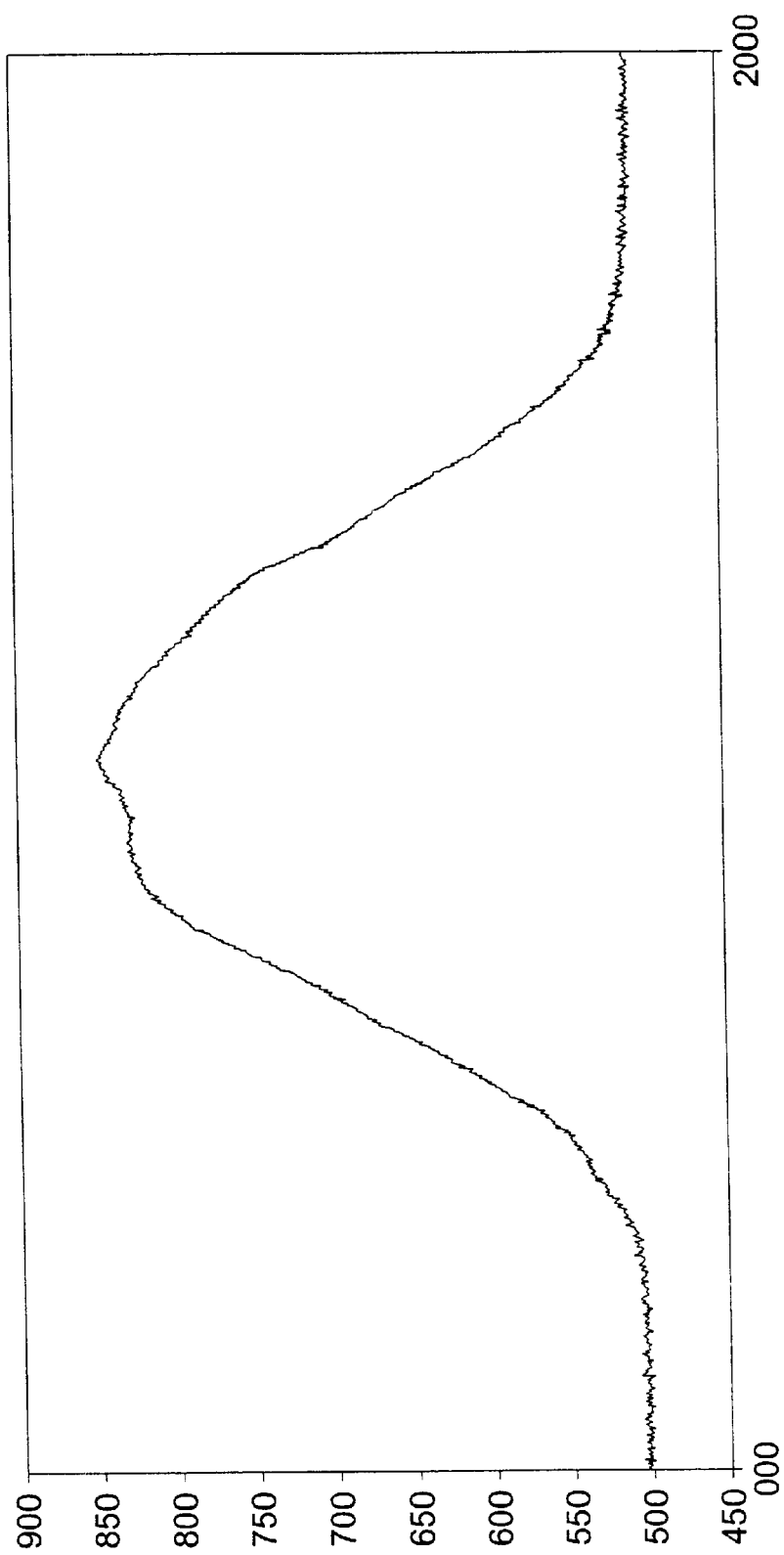
FIG. 4 is an inductive signature recorded for a vehicle using one embodiment of the present invention.

FIGS. 2 and 3 represent the output obtained from the circuit of FIG. 1. Cancellation of the noise induced into the wire-loop is achieved by mixing two signals generated by the circuit of FIG. 1: $V_{18}$ and $V_{19}$. Specifically, FIG. 2 illustrates the raw voltage of $V_{18}$ in a first plot 12 and $V_{19}$ in a second plot 14. $V_{13}$ represents the voltage function output from the oscillator 11 while $V_{14}$ represents the current function. At the output of the oscillator 11, the current function and the voltage function are 90° out of phase. However, by inductively coupling the inductor $L_3$ with the inductor $L_1$, the phase of the current function $V_{14}$ is altered such that it coincides with that of the voltage function $V_{13}$. FIG. 3 illustrates a first plot 16 of $V_{19}$ subtracted from $V_{18}$ overlaid with a second plot 18 of $V_{19}$ added to $V_{18}$. By subtracting $V_{19}$ from $V_{18}$ the noise is canceled and the inductance signal is increased showing the changing inductance. Conversely, by adding these two functions as in the second plot 18, the inductance signal is canceled and only the noise remains which may be useful for analysis or for referencing in additional noise-cancellation steps downstream. Those skilled in the art will recognize that although PMCR is shown here using an oscillator, the principles taught herein can be applied to an alternate embodiment of the present invention such as where the wire-loop is driven by an impulse carrier signal rather than a free-running oscillator. Finally, by referencing the permeability-modulated current carrier to the voltage and removing the induced noise, an inductive signature, such as that illustrated in FIG. 4, representative of a vehicle is produced.

Figure 5:
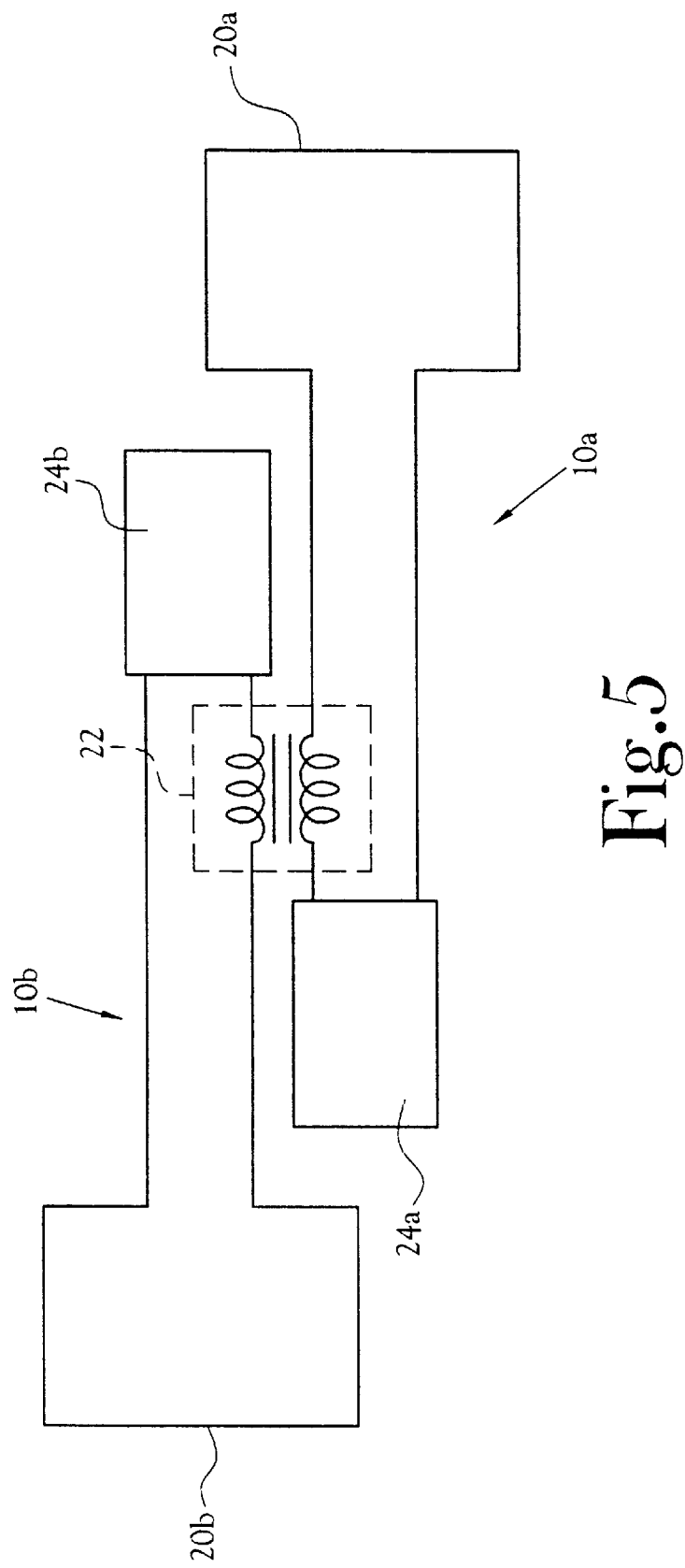
FIG. 5 is a schematic diagram of a passive transformer wired for crosstalk nullification between two wire-loops.

Another factor affecting the performance of the present invention is crosstalk. One method of reducing crosstalk is to nullify the underlying mutual inductive coupling of a plurality of wire-loops 20 using passive transformers 22. Because the direction of current flow in an inductor determines the direction of the induced differential current flow in inductors which are inductively coupled to it, a passive transformer 22 inductively linking the wire-loops 20a, 20b which are connected to inductive signature detection circuits 24a, 24b is used, as illustrated in FIG. 5. The passive transformer 22 inductively couples the inductors in precisely the opposite polarity and magnitude in which they were originally coupled. This has the effect of nullifying the original coupling and eliminating the potential for crosstalk at the source. In addition to removing the gross errors introduced by crosstalk, nullification of the inductive coupling also removes the more subtle transient errors in the detectors which appear as non-repeatable errors in recorded inductive signatures.

Figure 6:
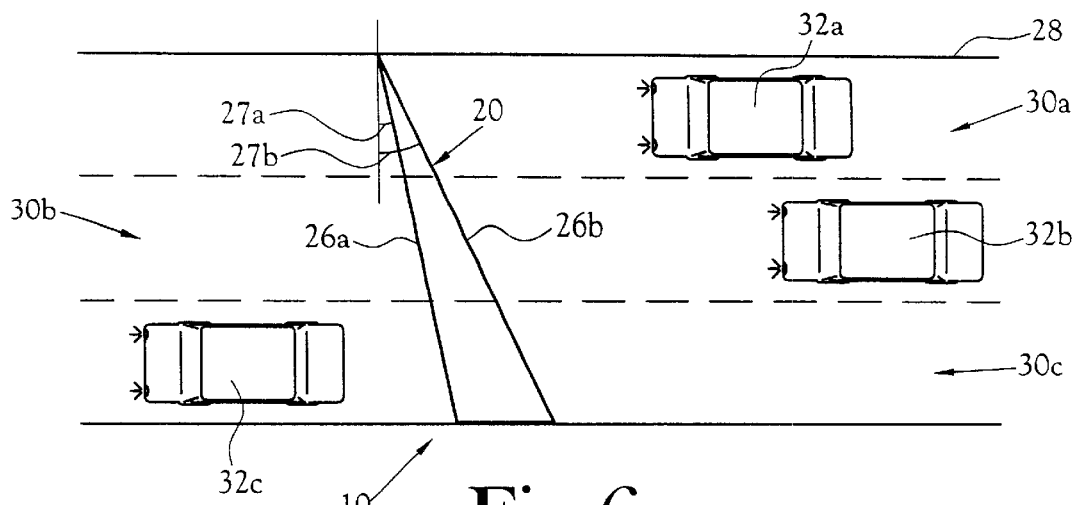
FIG. 6 depicts a single wire-loop deployed in the preferred wedge-shape configuration across three lanes of traffic for maximum data resolution.

A single-turn wire-loop spanning the width of one or more traffic lanes 30 of a roadway 28 is sufficient to detect the speed, the direction, the lane position, and the wheelbase dimensions for any vehicle 32 passing over the wire-loop. The speed and the lateral lane position of a vehicle 32 are unambiguously determined if the two active legs 26a, 26b of the wire-loops 20 span the traffic lanes 30 at different skew angles 27a, 27b as illustrated in FIG. 6. in the preferred embodiment, the configuration of each wire-loop 20 is deployed in a wedge-shaped configuration defining an acute triangle. Other embodiments of the present invention which include symmetrically skewed legs, and parallel skewed legs of the single wire-loop are contemplated but are not preferred. Symmetric skew angles also produce useful data, but are ambiguous in resolving the vehicle direction. Similar skew angles are unable to resolve the lane position; however, this is not as important for single traffic lanes as it is for multiple traffic lanes. Finally, zero skew angles can produce speed and axle-count data, but are ambiguous in resolving vehicle direction, can not resolve the lane position or the width of the wheelbase, and are ambiguous with respect to vehicle continuity when multiple traffic lanes are involved.

Figure 7:
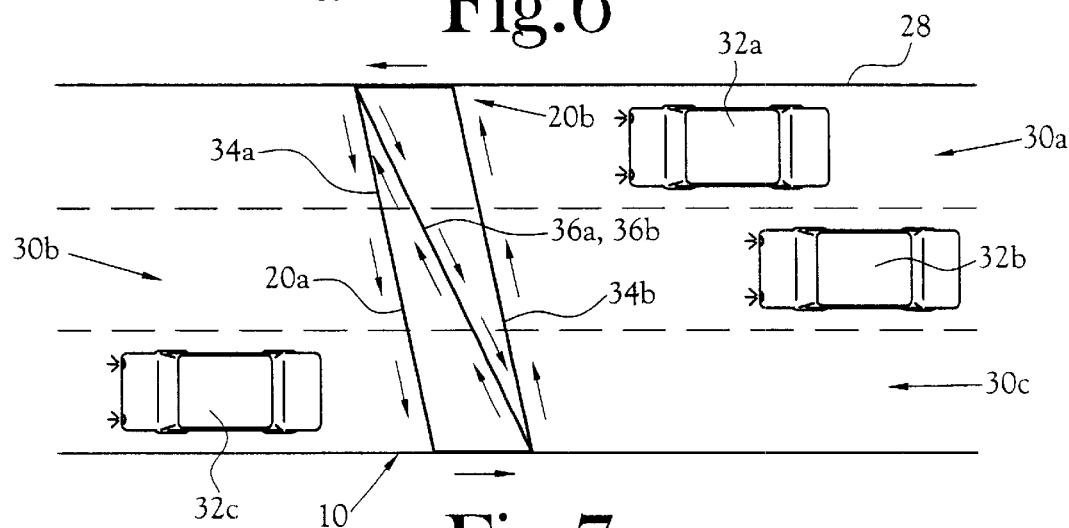
FIG. 7 depicts a pair of complimentary wedge-shaped configuration wire-loops deployed across three lanes of traffic with opposing current flow to nullify the magnetic field of the two common legs.
Figure 8:
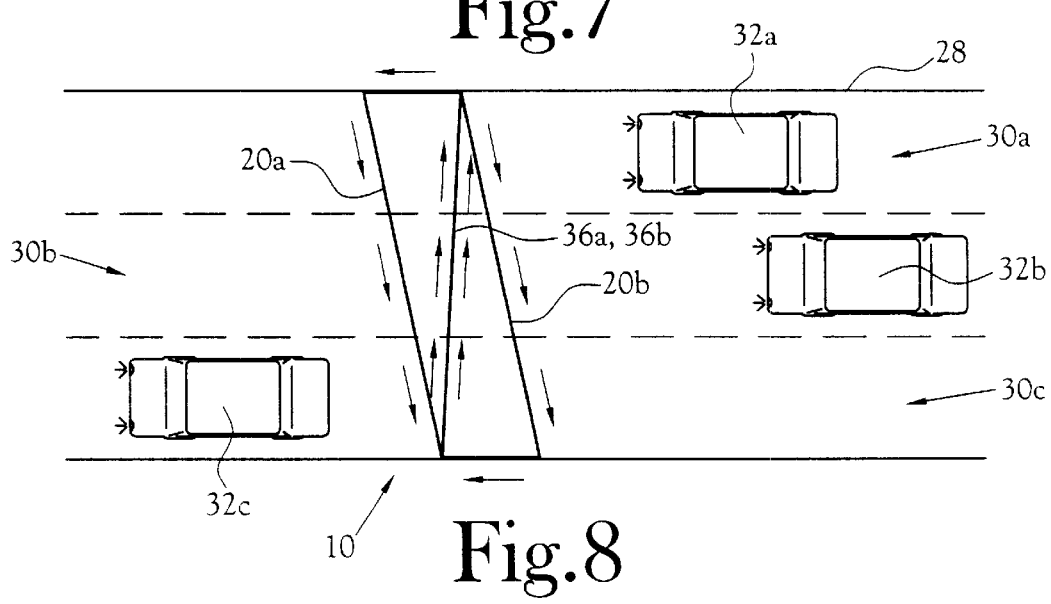
FIG. 8 depicts a pair of complimentary wedge-shaped configuration wire-loops deployed across three lanes of traffic with complimentary current flow to accentuate the magnetic field of the two common legs.

For multi-lane traffic, a pair of single-turn wire-loops in the preferred embodiment of FIGS. 7 and 8 is ideal for collecting the maximum unambiguous traffic-flow data. Specifically, the wire-loop wedges 20 are deployed in a complimentary configuration such that the outer legs 34a, 34b are approximately parallel and the inner legs 36a, 36b are coincidental. In the wedge-shaped configuration, two legs 34, 36 of each wedge traverse the width of the roadway 28, preferably at two different skew angles 27a, 27b. The depth to which the wire is embedded in the pavement is the minimum depth consistent with reliable performance over time. Because thermal expansion of the pavement applies tensile stress to long wires which are embedded in it, it is preferred that the depth of the saw-cuts oscillate slightly in order to allow the pavement to expand without breaking the wires embedded therein. This configuration is a hybrid of rectangular wire-loops and blades which gives repeatability of signatures that is characteristic of the blades along with the less-intrusive installation that is characteristic of simple wire-loops. Shallow saw-cuts are desirable for a traffic sensor spanning long distances in a pavement surface to prevent the formation of a shear-plane and slot faulting. If the two wire-loops 20 are energized so that current flows as illustrated in FIG. 7, then the magnetic fields generated by the common center legs 36 of the wire-loops 20 cancel and the signatures recorded are the difference between the perturbations of the magnetic fields from the outside legs 34. Conversely, if the two wire-loops 20 are energized so that current flows as illustrated in FIG. 8, then the magnetic fields generated by the common center 36 legs of the wire-loops 20 combine making the common center legs 36 the dominant detection zone for this configuration.

FIG. 9 clearly illustrates the relative position of the legs 34, 36 of the wire-loops 20 as shown in FIGS. 7 and 8. Specifically, FIG. 9 illustrates a cross-section of the roadway 28 showing the slots 60 cut into the pavement for receiving the wire-loops 20. A filler material 62 is used to seal the slots and hold the wire-loops 20 in position.

FIG. 10 illustrates an alternate embodiment of a wire-loop configuration using two pair of wire-loops 20, 20' represented by legs 34, 36 and 34', 36'. The first pair 20 and second pair 20' of wire-loops are concentric and disposed in parallel, vertically separated planes. To maintain adequate vertical separation, a spacing member 64 is disposed between the first pair 20 and second pair 20' of wire-loops. Those skilled in the art will recognize that the spacing member 64 can be a separate member which is insertable between the wire-loop pairs or integrally formed with the wire-loop pairs to provide the desired separation without interfering with the objects and advantages of the present invention.

Separately energizing the wire-loops 20 produces still different results with the inductance depending upon the vehicle's lane of travel.

For example, in FIG. 7, if the first wire-loop 20a is energized, but the second wire-loop 20b is not, then the measured inductance strength is dependent upon the vehicle's lane of travel, increasing from the first lane 30a to the third lane 30c. Conversely, if the second wire-loop 20b is energized and the first wire-loop 20a is not, then the measured inductance strength decreases from the first lane 30a to the third lane 30c. By selectively energizing two or more wire-loops 20 in these various sensing configurations, a number of useful data points are produced. Multiple vehicle signatures recorded when more than one vehicle is being simultaneously sensed by the wire-loop are separated using deduction and linear algebra to solve the multiple simultaneous equations generated.

In the preferred embodiment of the present invention, each wheel of a vehicle 32 is detected as it rolls over each of the two road-traversing legs of the wedge-shaped wire-loop 20. For example, a four-wheel passenger vehicle 32 will produce eight distinct wheel spikes as it rolls over the wire-loop. Knowledge of the timing of the wheels spike events combined with the known geometry of the wire-loop 20 and the assumed rectangular geometry of the vehicle's wheelbase allows for the unambiguous derivation of the traffic parameters sought. The magnitude of the wheel spikes or other parameters of the vehicle are used for vehicle classification or for re-identification downstream and may be desirable in alternate embodiments.

In the preferred embodiment of the present invention, two time-stamps are detected for each wheel that rolls over the sensor; one for each leg of the wire-loop which spans the traffic lane. A four-wheel passenger vehicle for example, generates eight time-stamps as it passes over the wire-loop. In one embodiment, each time-stamp is expressed as a 16-bit integer resulting in a 16-byte description of the vehicle passing over the wire-loop. More information which would be useful for downstream re-identification of the vehicle could be collected if desired, such as the wheel-spike amplitude, the body profile, etc. For large traffic flows, it is highly desirable for a traffic sensor to produce compact records on a per-vehicle basis to minimize the data storage requirements.

Figure 11:
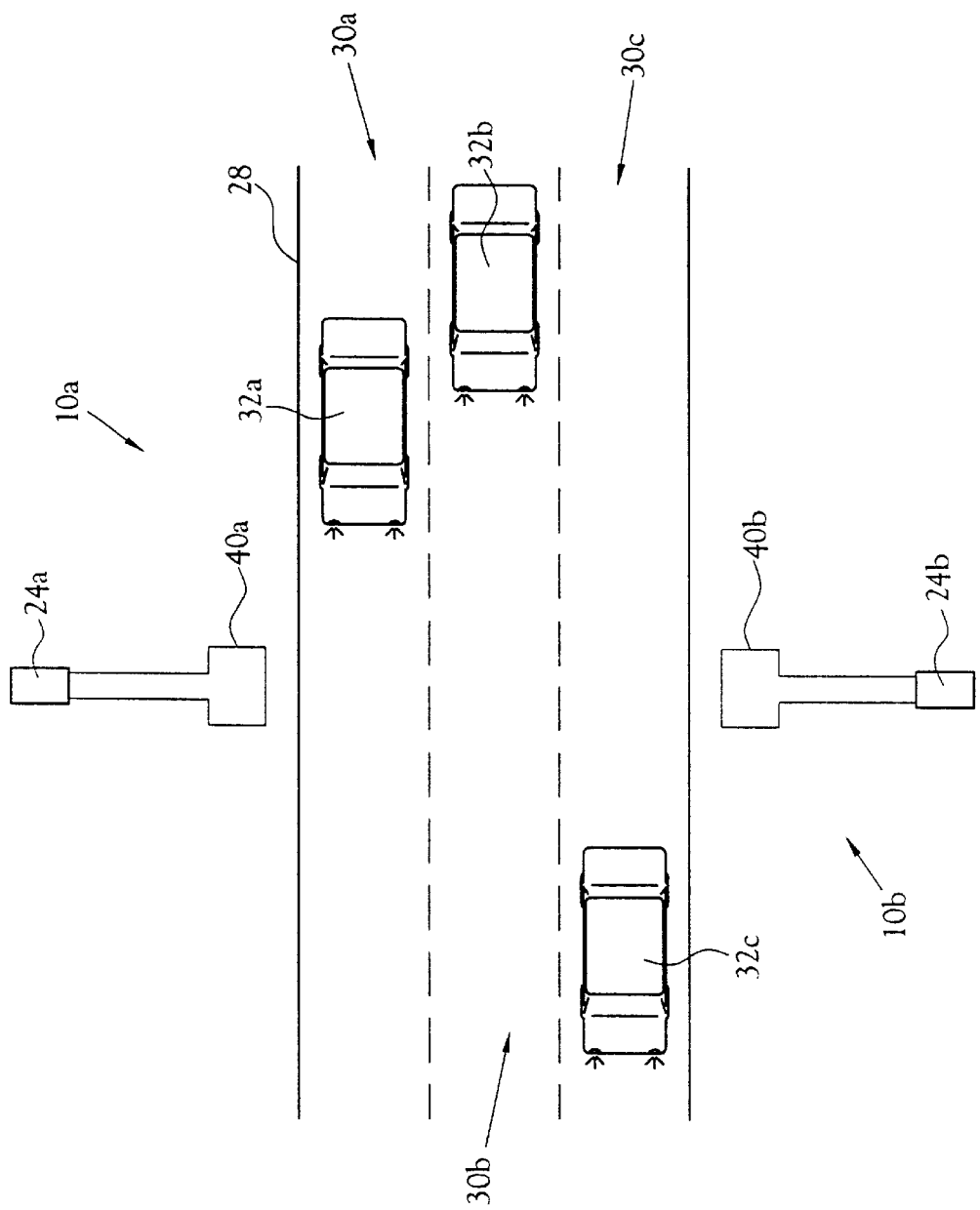
FIG. 11 depicts a non-intrusive wire-loop vehicle detector deployed in a horizontal configuration.
Figure 12:
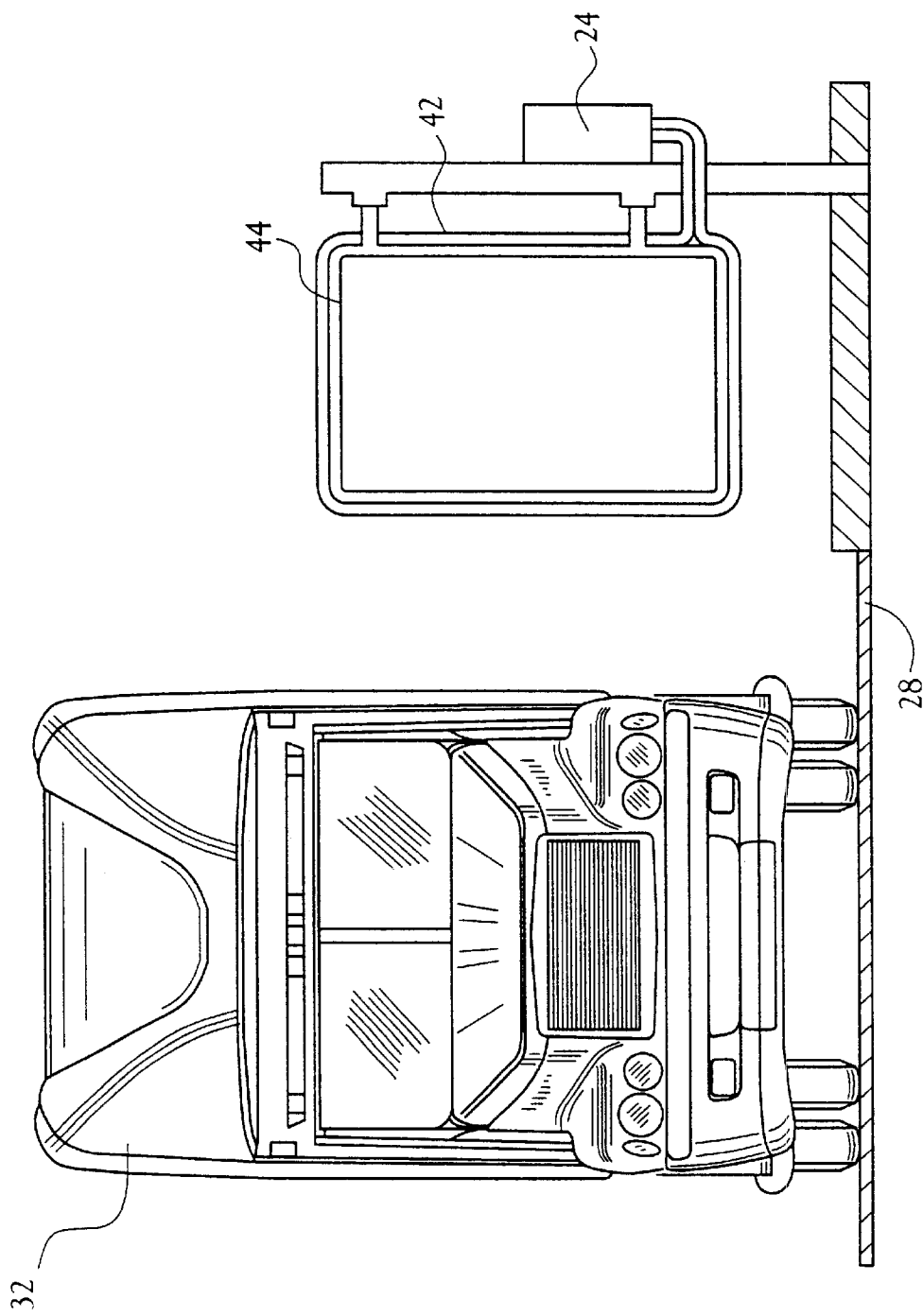
FIG. 12 depicts one embodiment of a non-intrusive wire-loop vehicle detector deployed in a vertical configuration.
Figure 13:
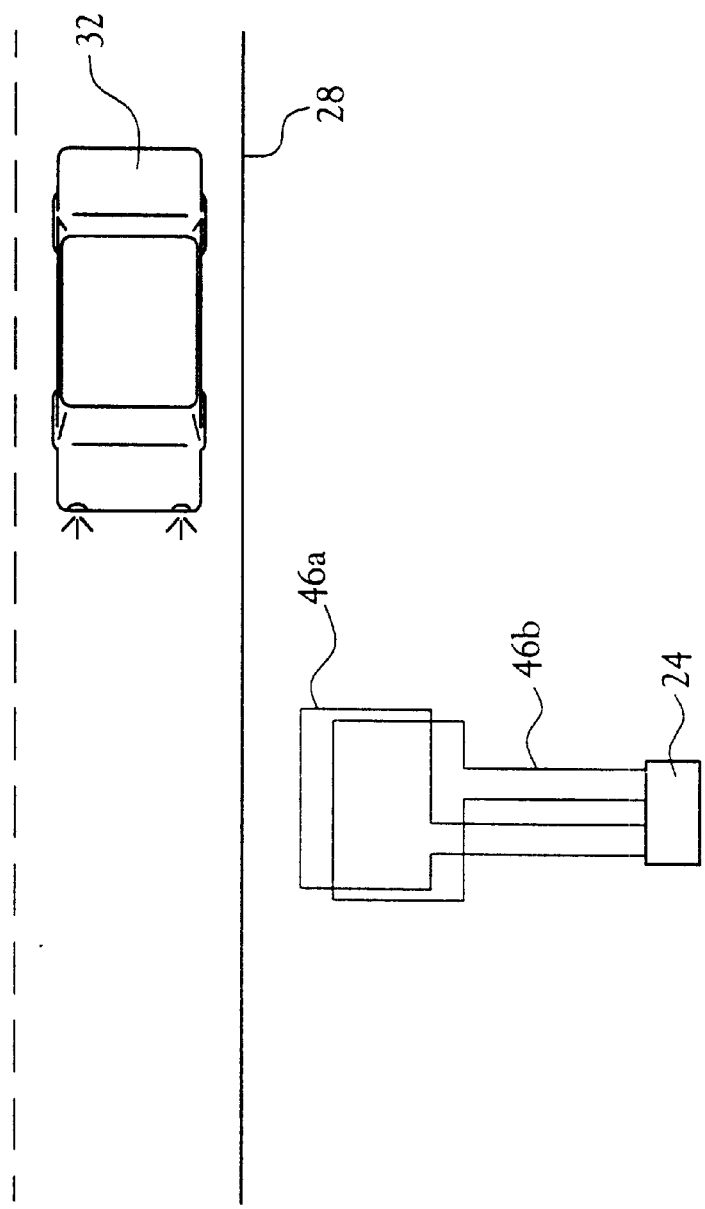
FIG. 13 depicts an alternate embodiment of a non-intrusive wire-loop vehicle detector having a pair of horizontally oriented wire-loops.

Referring now to FIGS. 11 through 13, a large-aperture wire-loop can detect metallic objects at great distances. The magnetic field generated by a wire-loop is highly directional at a significant distance from the wire-loop. More precisely, a wire-loop is most sensitive to distant objects in the same plane as the wire-loop and sensitivity decreases as the object moves away from the plane of the wire-loop. At a significant distance, objects approaching the plane perpendicular to that of the wire-loop are virtually invisible to the wire-loop. This directional sensitivity of the wire-loop is useful in determining the relative direction to detected objects in a similar way as a radar antenna is directional. Accordingly, large-aperture wire-loops are useful in non-intrusive vehicle-detecting applications because they do not need to be embedded in or laid on the pavement to detect passing vehicles.

The large-aperture wire-loops may be deployed in a number of configurations. FIG. 11 illustrates a single large-aperture wire-loop 40 deployed in a horizontal orientation on each side of the roadway. Using a single loop 40, the presence of a vehicle is detected when proximate the wire-loop but additional information such as the lane of travel is unavailable. However, by employing two loops 40a, 40b, the relative inductance measured at each loop 40 is used to identify the lane of travel. FIG. 12 illustrates a single large-aperture wire-loop 42 deployed in a vertical orientation adjacent a roadway. The wire-loop is shaped around a loop-forming member 44. FIG. 13 illustrates a pair of large-aperture wire-loops 46a, 46b deployed on one side of a roadway. The centers of the wire-loops 46a, 46b are offset such that one wire-loop 46a is closer to the roadway 28 than the other 46b. In the illustrated embodiment, the wire-loops are offset in the direction of travel along the roadway to clearly show that two separate wire-loops exist; however, such offset is not necessary for operation. The illustrated configuration produces a differential between the relative inductance measured by the inductive sensor 10 allowing additional information such as the lane of travel to be identified. Those skilled in the art will recognize that principles of the teachings of the present invention can be applied to the non-intrusive large aperture wire-loop configurations without interfering with the objects of the present invention.

Figure 14:
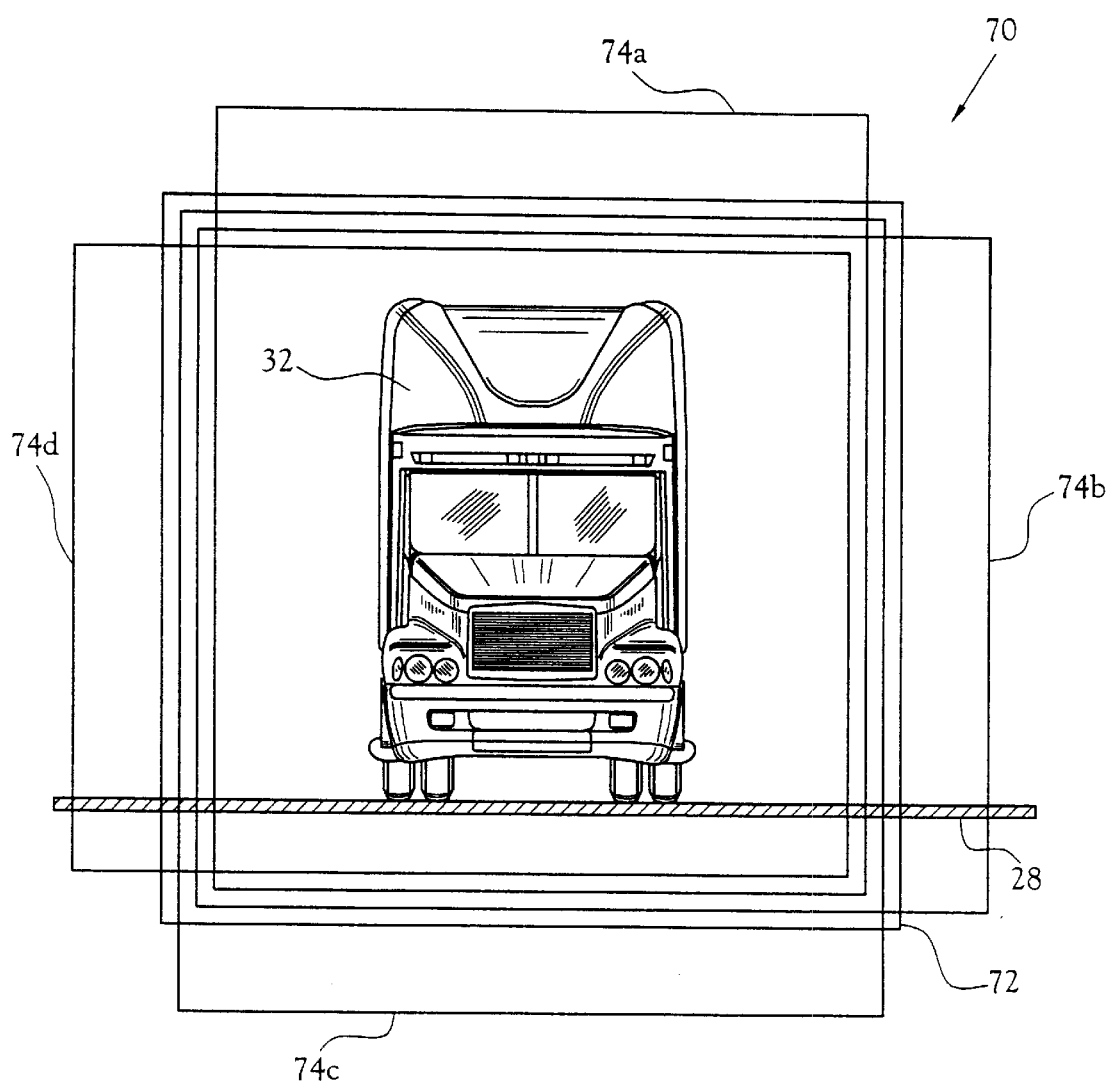
FIG. 14 illustrates a pass-through wire-loop configuration.

FIG. 14 illustrates a pass-through wire-loop configuration 70. The pass-through configuration 70 includes a central wire-loop 72 deployed such that the vehicle passes through the center of the open wire-loop. At least one additional outer wire-loop 74 is deployed in conjunction with the central wire-loop 72. Each outer wire-loop 74 has a first dimension which is substantially equal to the corresponding dimension of the central wire-loop 72 and a second dimension which is larger than the corresponding dimension of the central wire-loop 72. Each outer wire-loop 74 is disposed so that it coincides with the central wire-loop 72 on three sides. The fourth side of the outer wire-loop 74 and the central wire-loop 72 are offset by the difference in the dimensions. In the illustrated embodiment, four outer wire-loops 74a–74d are used. By selectively energizing one of the outer wire-loops 74a–74d and the central wire-loop 72, the changing inductance is measured from any one of the four orientations allowing additional information to be obtained about the vehicle. Such a pass through detector 70 is also useful for walk-through metal detectors to identify not only the presence of a metal object, but also the relative location of the object. Although not shown in FIG. 14, those skilled in the art will recognize various methods and apparatuses for maintaining the shape and position of the wire-loops used in the pass-through configuration. Further, those skilled in the art will recognize that any of the teachings of the present invention can be applied to the pass through configuration without interfering with the objects of present invention.

Figure 15:
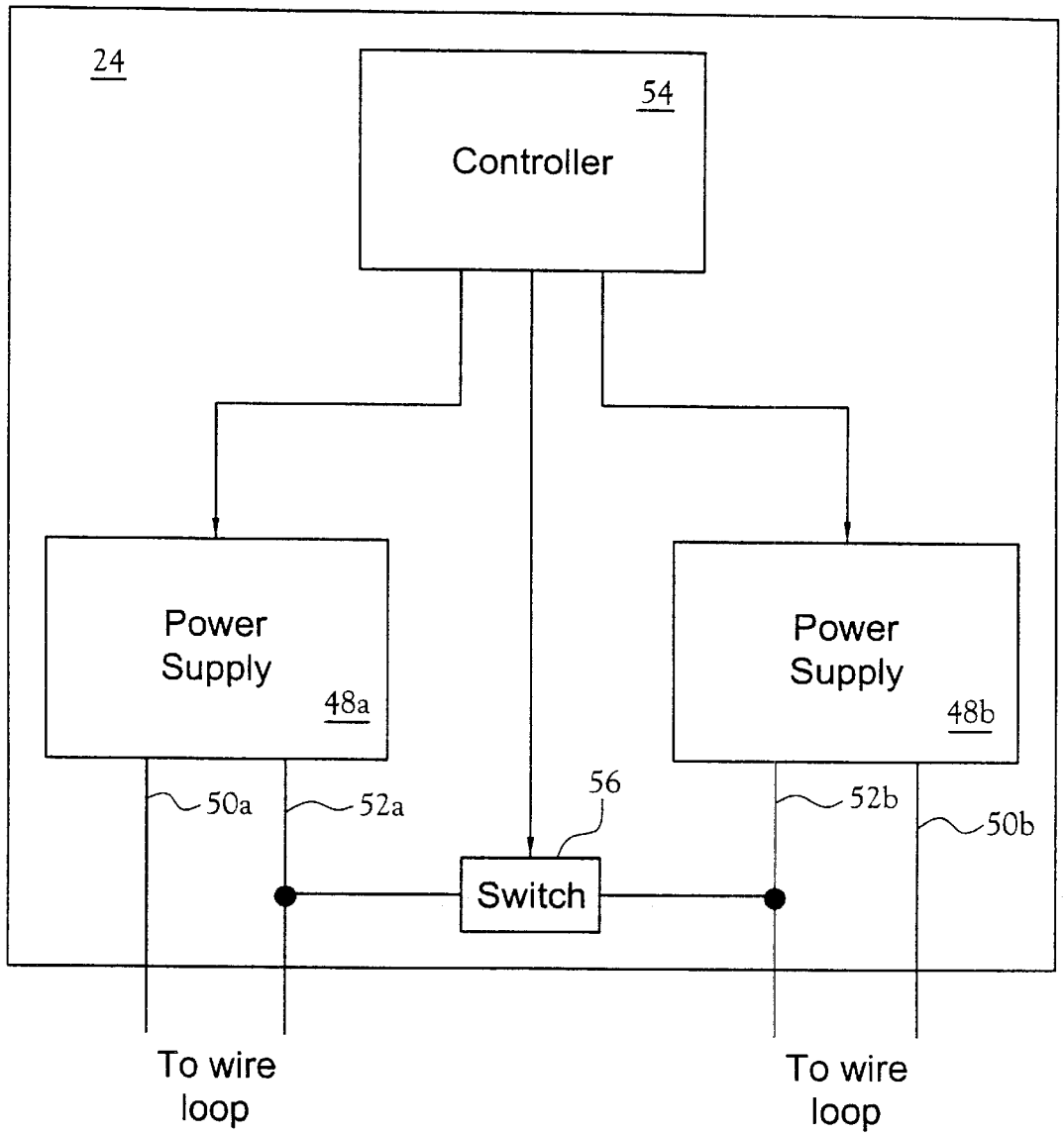
FIG. 15 illustrates a block diagram of one embodiment of a control box of the wire-loop vehicle detector of the present invention.

FIG. 15 illustrates a block diagram of the control box 24 configured for use with a pair of wire-loops 20. in the illustrated embodiment, the control box 24 contains a power supply 48 for each of the pair of wire-loops 20. Each power supply 48 is responsive to a controller 54. The controller 54 directs the operation of the power supplies 48 to selectively energize the corresponding wire-loop 20. Each power supply 48 is capable of reversing the polarity of the outputs 50, 52 thereby allowing the controller 54 to dictate the direction of current flow through the wire-loops. Further, the control box 24 includes a switch 56 that serially connects the wire-loops 20 to present a single current path. This allows the wire-loops 20 to be joined thereby equalizing the apparent inductance and preventing any divergence in phase angle. In the illustrated embodiment, the switch 56 is responsive to the controller 54; however, those skilled in the art will recognize that the linking of the wire-loops can be accomplished in a number of ways without interfering with the objects and advantages of the present invention.

Accordingly, an apparatus and method for measuring the inductance of a wire-loop without direct reference to any particular time-constant or frequency has been disclosed. By comparing the permeability-modulated current carrier function, I(t), with the voltage function, V(t), changes in the inductance of a wire-loop caused by a vehicle passing over a wire-loop are isolated. Crosstalk is nullified using passive transformers. For inductance detection, a pair of single-turn wire-loops are deployed in a complimentary wedge-shaped configuration for collecting the maximum unambiguous traffic-flow data. By selectively energizing each wire-loop, a variety of traffic-flow data can be measured. Finally, the apparatus and method disclosed herein permits the use of large-aperture wire-loops in non-intrusive vehicle-detecting applications.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. An inductive sensor for use on a roadway having a surface, said inductive sensor comprising:
   at least one wire-loop disposed outside of the roadway surface; and
   a power source in electrical communication with said at least one wire-loop.

2. The inductive sensor of claim 1 wherein said at least one wire-loop is oriented substantially parallel to the roadway surface.

3. The inductive sensor of claim 1 wherein said at least one wire-loop is oriented substantially perpendicular to the roadway surface.

4. The inductive sensor of claim 3 further comprising a loop forming member around which each said at least one wire-loop is formed.

5. The inductive sensor of claim 1 wherein each of said at least one wire-loop defines an independent current path.

6. The inductive sensor of claim 1 having a pair of wire-loops, wherein said pair of wire-loops is disposed on one side of the roadway.

7. The inductive sensor of claim 1 having a first wire-loop and a second wire-loop wherein said first wire-loop and said second wire-loop are disposed on opposing sides of the roadway.

8. An inductive sensor for use on a roadway having a surface, said inductive sensor comprising:
   a plurality of wire-loops disposed perpendicular to the roadway such that a vehicle traveling on the roadway passes through said plurality of wire-loops, said plurality of wire-loops including a central wire-loop and at least one outer wire-loop.

9. The inductive sensor of claim 8 wherein said central wire-loop and said at least one outer wire-loop are substantially equal in a first dimension and said at least one outer wire-loop is larger in a second dimension that said central wire-loop; said central wire-loop and said at least one outer wire-loop having sides which are substantially coincidental.

10. A vehicle detector for detecting vehicular traffic traveling on a roadway, the roadway defining a path of vehicular travel and a surface, said vehicle detector comprising:
    an inductance measurement circuit;
    a first wire-loop in electrical communication with said inductance measurement circuit, said first wire-loop deployed outside of the roadway surface, said first wire-loop defining a center located a first selected distance from the roadway; and
    a second wire-loop in electrical communication with said inductance measurement circuit, said second wire-loop deployed outside the roadway surface, said second wire-loop defining a center located a second selected distance from the roadway.

11. The vehicle detector of claim 10 wherein said first wire-loop and said second wire-loop are disposed on a single side of the roadway, said second distance being greater than said first distance.

12. The vehicle detector of claim 10 wherein said first wire-loop and said second wire-loop are disposed on opposite sides of the roadway, said second distance being substantially equal to said first distance.

13. The vehicle detector of claim 10 wherein each of said first wire-loop and said second wire-loop is substantially parallel to the roadway surface.

14. The vehicle detector of claim 10 wherein each of said first wire-loop and said second wire-loop is substantially perpendicular to the roadway surface.

15. The vehicle detector of claim 10 further comprising at least one loop-forming member, each of said first wire-loop and said second wire-loop being carried by said at least one loop-forming member.

16. A vehicle detector for detecting vehicular traffic traveling on a roadway, the roadway defining a surface, said vehicle detector comprising:
  an inductance measurement circuit;
  an inner wire-loop in electrical communication with said inductance measurement circuit, said inner wire-loop being substantially perpendicular to the roadway surface, said inner wire-loop defining no more than one longitudinal leg deployed entirely below the surface of the roadway, said inner wire-loop configured such that vehicular traffic on the roadway passes through an aperture defined by said inner wire-loop; and
  at least one outer wire-loop in electrical communication with said inductance measurement circuit, said at least one outer wire-loop being substantially perpendicular to the roadway surface, said at least one outer wire-loop defining no more than one longitudinal leg deployed entirely below the surface of the roadway, said at least one outer wire-loop configured such that vehicular traffic on the roadway passes through an aperture defined by said at least one outer wire-loop, said at least one outer wire-loop being concentric with said inner wire-loop.

17. A method for detecting a vehicle and for determining the vehicle's lateral position on a roadway, the roadway defining a surface, said method comprising the steps of:
  (a) deploying a first wire-loop sensor outside of the roadway surface at a first known position;
  (b) deploying a second wire-loop sensor outside of the roadway surface at a second known position offset from said first known position;
  (c) measuring an inductance differential representing a difference in a measured inductance on said first wire-loop sensor and a measured inductance on said second wire-loop sensor; and
  (d) determining a lateral position of the vehicle based upon said inductance differential.

18. The method of claim 17, wherein the roadway includes a plurality of traffic lanes having a known width, further comprising the step of identifying the vehicle's lane of travel using said lateral position and said plurality of traffic lane known widths.

19. The method of claim 17 further comprising the step of selectively energizing each of said first wire-loop sensor and said second wire-loop sensor.

20. A method for detecting a metallic object passing through a inductive sensor and for determining the metallic object's position relative to the inductive sensor, said method comprising the steps of:
  (a) deploying an inductive sensor including a plurality of wire-loops in a substantially coplanar arrangement such that an object passes through a central opening defined by said inductive sensor;
  (b) measuring an inductance differential representing a difference in a measured inductance on each of said plurality of wire-loops; and
  (c) determining a position of the metallic object relative to said inductive sensor based upon said inductance differential.

21. The method of claim 20 further comprising the step of selectively energizing each of plurality of wire-loops.

* * * * *